United States Patent [19]

Zellner et al.

[11] Patent Number: 4,786,342

[45] Date of Patent: Nov. 22, 1988

[54] METHOD FOR PRODUCING CAST TAPE FINISH ON A DRY-PRESSED SUBSTRATE

[75] Inventors: James E. Zellner, Denver; Robert M. Martin, Golden, both of Colo.

[73] Assignee: Coors Porcelain Company, Golden, Colo.

[21] Appl. No.: 929,386

[22] Filed: Nov. 10, 1986

[51] Int. Cl.⁴ .................. B32B 18/00; B32B 31/20
[52] U.S. Cl. ......................... 156/89; 156/231; 156/243; 156/246; 156/247; 156/249; 156/261; 264/58; 264/63; 264/67
[58] Field of Search .............. 156/89, 231, 243, 246, 156/248, 249, 261, 264; 264/58, 63, 67

[56] References Cited

U.S. PATENT DOCUMENTS

| | | | |
|---|---|---|---|
| 2,758,074 | 8/1956 | Black et al. | 204/15 |
| 2,925,645 | 2/1960 | Bell et al. | 29/155.5 |
| 2,972,003 | 2/1961 | Greenman et al. | 174/68.5 |
| 2,986,804 | 6/1961 | Greenman et al. | 29/155.5 |
| 3,031,344 | 4/1962 | Sher | 428/551 |
| 3,186,883 | 6/1965 | Frantzen | 156/625 |
| 3,189,978 | 6/1965 | Stetson | 29/155.5 |
| 3,518,756 | 7/1970 | Bennett et al. | 156/89 |
| 3,695,960 | 10/1972 | Richter | 156/89 |
| 3,768,144 | 10/1973 | Heinss | 264/67 |
| 3,770,529 | 11/1973 | Anderson | 156/89 |
| 4,340,635 | 7/1982 | Langman et al. | 428/164 |
| 4,465,538 | 8/1984 | Schmoock | 156/233 |
| 4,539,058 | 9/1985 | Burgess et al. | 156/261 |

OTHER PUBLICATIONS

"Tape Casting of Ceramics", R. E. Mistler, D. J. Shanefield, R. B. Runk, pp. 411–440.

Primary Examiner—Caleb Weston
Attorney, Agent, or Firm—Sheridan, Ross & McIntosh

[57] ABSTRACT

A method is provided for producing a ceramic substrate with at least one surface having sufficient smoothness to allow for placement of fine line electrical circuitry. A ceramic powder is placed in a die. A ceramic tape is formed having one surface with a desired degree of smoothness. A portion of the tape is placed into the die with the surface opposite the smooth surface in contact with the ceramic powder. The powder and tape are dry pressed to form an integral ceramic green body with a smooth surface. The green body can be sintered to form a sintered smooth-surfaced ceramic substrate. The smooth-faced ceramic substrate can be formed with the smooth face countersunk or with edges pulled back. A ceramic substrate can be formed with a conductive material between the cast tape layer and the base layer. A ceramic tape cast on a smooth carrier such as polyvinyl butyral and a method for producing such cast tape is also disclosed.

15 Claims, 4 Drawing Sheets

METHOD FOR PRODUCING CAST TAPE FINISH ON A DRY-PRESSED SUBSTRATE

FIELD OF THE INVENTION

This invention relates to ceramic substrates for electrical circuitry and a method for manufacture thereof, and particularly to a smooth-surfaced ceramic substrate for fine-line electrical circuitry having a cast tape component.

BACKGROUND INFORMATION

In the electronics industry, a substrate or board is used to support integrated circuits or electronic components. The circuitry connecting these components is often provided by applying electrically conductive lines, such as by printing, vapor deposition or other means, on one or more surfaces of these substrates. In many applications, it is advantageous to form these substrates substantially from ceramic materials because such ceramic materials can be fashioned so as to possess desired electrical insulating characteristics, as well as good thermal or chemical stability.

The recent history of the electronics industry has shown the desirability, in many applications, of miniaturization, i.e. placing a larger number of components and circuit elements onto a smaller surface area. In connection with this trend, it is often advantageous to provide the surface of a substrate with electrical circuitry which is extremely fine-lined.

Experience has shown that in order for fine-lined circuitry to be placed on a surface of the substrate, the substrate must be substantially without surface defects such as pits, voids, protrusions, and so on. The degree of smoothness necessary for a substrate depends upon the fineness of the desired lines, i.e. the minimum width of the circuitry lines to be placed on the surface. Generally finer circuitry lines require a greater degree of surface smoothness.

Several methods have been used in an attempt to provide the required surface smoothness for a ceramic substrate. Polishing a substrate surface is unacceptably costly because of the hardness of ceramic materials and furthermore is effective only to remove protrusions and cannot satisfactorily fill voids or pits. Glazing the substrate with a thin layer of a material such as a glass produces undesirable characteristics such as reductions in adhesion, thermal conductivity, chemical resistance and electrical insulation between adjacent conductive paths. Spraying or otherwise placing a layer of fine-grained flowable ceramic material on a surface of a dry pressed product or body suffices for some purposes, but has its own drawbacks. This technique depends on a "reflow" of the sprayed ceramic slurry to establish a flat surface by virtue of quasi-fluid flow under the influence of gravity. Thus, surface characteristics such as smoothness can be adversely affected by surface tension, by the viscosity of the slurry, and other factors. This method results in covering substantially the entire surface of the dry pressed product and thus is not useful when it is desired to provide a "pull back" in which the high quality smooth surface is set back some distance from the edges of the dry pressed product. When the finished product or ceramic substrate includes one or more holes extending through the substrate, spraying a fine-grained ceramic slurry on the dry pressed product may result in the slurry partially flowing over the holes of the dry pressed product, in some cases causing parts to fail to meet pin or metric eye tests. Finally, the spray method normally requires two firings of the substrate, one firing before the spraying operation and a second firing after the spraying operation. This two-firing process increases substrate expense compared with methods requiring a single firing.

SUMMARY OF THE INVENTION

A method of producing a smooth-faced green body ceramic substrate is disclosed. Also disclosed is a smooth-faced green body ceramic substrate comprising a ceramic powder base and a cast tape layer having a first smooth surface and another surface. This other surface, which may also be smooth, but need not be as smooth as the first smooth surface, is dry pressed to the base. The method for producing a smooth-faced green body can be followed by sintering the green body to produce a smooth-faced sintered ceramic substrate.

In making the smooth-faced substrate, a die having a cavity of the size desired for the green body is partially filled with ceramic material, e.g. aluminum or beryllium oxides, in a flowable powdered form. The ceramic material normally is mixed with an amount of binder, and dried, such as by spray drying to make a flowable ceramic material.

A ceramic tape is formed, by any of a number of methods. The ceramic material used for the tape must be compatible with the ceramic material in the die in the sense that the two ceramic materials can be dry pressed to form an integral object and can be sintered together without warping, cambering, or separation of layers. The cast tape must be formed having at least one of its faces with sufficient smoothness to allow successful placement, on the finished product, of electrical circuitry with the desired degree of fineness of lines. The smoothness of a face of the tape is achieved by placing the ceramic material, such as a ceramic slip, on a smooth-surfaced film. The film may be any of a number of materials including metal, glass plate and plastic. The ceramic can be placed on the film in a number of ways including doctoring, spraying and deposition. When compatibility requirements make it necessary to use a ceramic with a relatively small amount of binder, a carrier layer can be placed on the film and the ceramic can be placed on the carrier layer. The ceramic material is then dried such as by heating or air drying. The tape can be compressed by rollers or other pressing apparatuses.

The tape is turned over so that the tape face which is opposite the smoother face is on the bottom of the tape. A portion of the tape is positioned to lie over the top of the filled die cavity. A punch is applied to the tape to punch out a portion of the tape which will fit within the cavity of the die. The punch is then further pressed into the die to subject the powdered ceramic base layer and the ceramic tape layer to pressure. The pressure acts to produce an integrated piece, i.e. a piece with the ceramic tape layer joined to the base layer securely enough that the green body can be handled without separation of the two layers. In general, a higher amount of pressure will reduce the amount of shrinkage which occurs during subsequent sintering.

The green body is an integrated two-layer body having a thickness on the order of that normally produced by dry press methods, i.e. thicker than normally produced by a cast tape method. The green body has at least one surface with a smoothness obtainable by a cast tape method, i.e. smoother than that obtainable from a normal dry press method. The surface smoothness of the green body thus produced is controlled such that the smooth surface is substantially free of protrusions, pits or voids of a size which would interfere with placement of effective high resolution circuitry having the desired degree of fineness of lines.

The surface smoothness of the green body is independent of surface tension or gravity reflow considerations such as those which figure into the smoothness of a sprayed-surface substrate. The cast tape layer of the body is composed of ceramic material so as to have the high degree of electrical insulative ability and thermal tolerance associated with ceramic materials.

After the green body is pressed, it can be further processed by sintering to produce a sintered smooth-surfaced ceramic substrate. Sintering can be accomplished under the conditions normally used for the ceramic materials being employed. The sintered ceramic substrate has a dry pressed base layer integral with a smooth-faced cast tape layer. The sintered substrate or body has a thickness comparable to that obtained with dry press methods but a surface smoothness comparable to that obtained from cast tape methods.

DETAILED DESCRIPTION OF THE PREFERRED EMBODIMENTS

Figure 1:
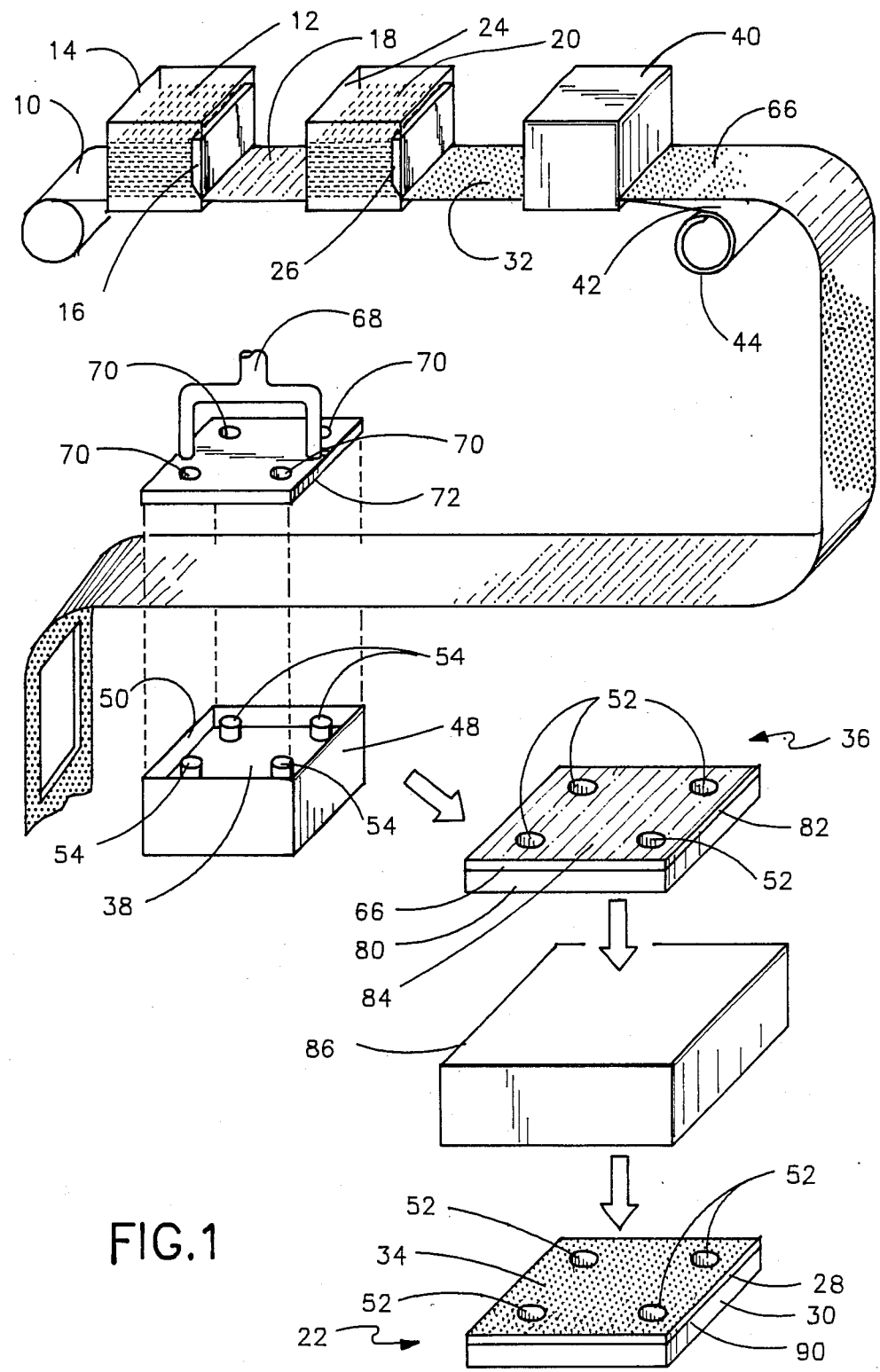
FIG. 1 is a schematic diagram of the process for producing a smooth-surfaced ceramic substrate.

In the preferred embodiment of this invention, a film 10 is provided. One surface of this film will be used for the casting of ceramic tape, so that at least one surface of the film 10 must have a desired degree of smoothness. The degree of smoothness of the film 10 which is required is at least equal to the degree of smoothness which is required in the ceramic tape, as described below. In addition, the film 10 must have sufficient strength to support the cast tape and transport it through several stages of the tape casting process as described below. Further, in those embodiments in which the film 10 is to be stripped from the cast tape, the film must have the necessary release quality with respect to the cast tape material. Specifically, in such an embodiment, the film 10 must not adhere to the cast tape to such a degree that, upon stripping the film 10, the cast tape will become stretched, torn or otherwise deformed.

A number of materials have been found suitable for use as the film 10. In particular, some polyester materials marketed under the trademarks MYLAR and CELENAR have been found suitable for use in the present invention.

In one embodiment, a carrier material 12 is applied to the smooth surface of the film 10. The carrier material 12 will form the surface which will determine the smoothness of the finished product, so that the carrier material 12 must be applied to the smooth surface of the film 10 in such a manner that the carrier material 12 forms a layer having substantially the same degree of smoothness as the smooth surface of the film 10. Doctoring the carrier material 12 onto the smooth surface of the film 10 has been found to be a suitable method of application. According to this method, a reservoir 14 is provided for holding an amount of the carrier material 12. The carrier material 12 is preferably in a liquid or dissolved form or a liquid precursor form, i.e., a liquid material which upon drying produces the desired solid carrier material 12. The liquid from the reservoir 14 is applied to the surface of the film 10 using a doctor blade 16. The doctor blade 16 is maintained in a position above the surface of the film 10 so that as the film 10 is moved past the edge of the doctor blade 16, a layer 18 of carrier material 12 is deposited on the smooth surface of the film 10. Other methods of applying the carrier material 12 to the film 10 include spraying, brushing, and roller coating.

The carrier material 12 must be capable of application to the smooth surface of the film 10 in such a manner that a layer of carrier material 18 is formed having substantially the same smoothness as the film 10. Further, the carrier material 12 must produce a carrier having sufficient strength or toughness that the cast ceramic is supported sufficiently to withstand the punching, handling and pressing steps described below. Polyvinyl butyral has been found to possess the desired qualities. Thus, in the preferred embodiment, the reservoir 14 contains a solution of polyvinyl butyral in a solvent. The polyvinyl butyral is doctored onto the smooth surface of the film 10 to produce, upon drying, a layer 18 of carrier material having the desired degree of smoothness. The thickness of the carrier layer 18 can be varied from less than 0.0002 of an inch thick to as much as 0.002 of an inch thick or more. In general, it is preferred to produce a carrier layer 18 which is as thin as possible, in order to produce a fast-drying carrier layer, consistent with the requirements for providing the support necessary for the cast tape.

A ceramic slip material 20 is applied to the exposed surface of the carrier layer 18. The interface between the ceramic slip material 20 and the carrier layer 18 will determine the smooth surface of the finished product 22. Thus, the ceramic slip material 20 is applied to the exposed surface of the carrier layer 18 in such a manner that the ceramic slip material 20, at the interface with the carrier layer 18 substantially assumes the degree of smoothness of the carrier layer 18. The preferred method of application of the ceramic slip material 20 is by doctoring, in a manner similar to that described in connection with the application of the carrier material 12. Such a doctoring method uses a second reservoir 24 and a second doctor blade 26. As with the application of the carrier material 12, the ceramic slip material 20 can also be applied by other suitable methods such as spraying.

The ceramic slip material 20 contains a ceramic material which, after drying and sintering, will form the substance of the upper layer 28 of the finished product 22. This ceramic material thus must possess the electrical, insulative, thermal and chemical characteristics required for a ceramic substrate suitable for electrical circuitry. Further, the ceramic material must be capable of being formed into a slip which can be applied to the carrier layer or otherwise formed into a ceramic tape having one surface with the required degree of smoothness. The ceramic material must be compatible with that ceramic material which forms the lower layer 30 of the finished product 22, as discussed below in relation to the dry press material. In general, all materials which are known to be useful as a ceramic substrate for electrical circuitry can be used on the ceramic slip material of the present invention. Examples of such ceramic material include alumina, beryllia, zirconia, aluminum nitrite, silicon carbide and the like.

The ceramic slip material 20 is applied to the carrier layer 18 to form a ceramic tape 32. The ceramic tape 32, in the depicted embodiment comprises a layer of ceramic material 20 adjacent to the carrier layer 18. The ceramic tape 32 is adjacent to the film layer 10. The ceramic tape 32 can be formed in a range of thicknesses from less than 0.002 inches to 0.02 inches or more. It is preferable to produce a ceramic tape 32 which is as thin as possible, in order to accelerate drying time, consistent with providing a ceramic tape sufficiently strong to undergo punching, handling and pressing without breaking, crumbling or degrading the smoothness of the ceramic tape surface to an unacceptable degree. The ceramic tape is preferably 0.003 to 0.007 inches thick, and most preferably about 0.005 inches thick.

By whatever method the ceramic tape 32 is produced, whether by doctoring ceramic material 20 onto a carrier 18 or otherwise, the ceramic tape 32 must be produced with at least one surface having sufficient smoothness such that after the ceramic tape undergoes the punching, handling, pressing and sintering steps described below, the finished product 22 possesses a surface 34 having the required degree of smoothness. One manner of characterizing the smoothness of a surface is in terms of a micro-inch parameter. This smoothness is obtained by measuring the deviation from an ideal plane of the surface of the ceramic, such as by tracing a fine-pointed stylus over the surface of the ceramic and recording the movements of the stylus. The amount of deviation from an ideal plane of the surface of the ceramic can be characterized by an average of these stylus movements such as a root mean square average or an arithmetic average. The method of the present invention can be employed to produce a finished product 22 having a smooth surface 34 with an arithmetic average smoothness parameter on the order of at most 8 to 10 micro-inches. Production of such a finished product 22 requires that the ceramic tape 32 at the interface between the layer of ceramic slip material 20 and the carrier layer 18 have a smoothness somewhat greater than the smoothness of the finished product 22 since some slight amount of degradation of the smoothness of the interface surface occurs during subsequent steps of the process.

The ceramic slip material 20, besides containing a ceramic material, also contains materials to produce the required handling characteristics and to produce the desired chemical and mechanical characteristics of the finished product. Any of a number of formulations for ceramic slip material can be employed in the process of this invention, using compositions known to be useful for forming ceramic cast tape or ceramic substrates for electrical circuitry. The ceramic slip material must be of such a composition that upon drying it forms a ceramic tape which is compatible with the ceramic material which will form the lower layer 30 of the finished product 22. For purposes of the following discussion, the ceramic material which forms the lower layer 30 will be referred to as "dry press material", although it should be understood that this term also includes ceramic material which will form the lower layer 30 by means other than dry pressing, as discussed below. The characteristic of being compatible with the dry press material includes both the ability to adhere to the dry press material and the possession of similar shrinkage characteristics. The ceramic tape 32 must be able to adhere to the dry press material sufficiently that an integral body can be formed which does not separate or deteriorate under the handling required to produce a sintered finished product 22 from the green body 36. The ceramic tape 32 must have shrinkage characteristics which are sufficiently similar to the shrinkage characteristics of the dry press material 38 such that when the green body 36 is sintered, differential shrinkage of the cast tape upper layer 28 with respect to the shrinkage of the lower layer 30 does not result in significant warping in the finished product 22 or an unacceptable degree of internal stress in the finished product 22.

In general, a formulation for the ceramic slip material 20 which is substantially identical to the formulation for the dry press material 38 will result in a slip which is compatible. It is possible, however, to formulate a ceramic slip material 20 which is substantially different from, yet compatible with the dry press material 38. In this regard, it should be noted that the amount of shrinkage which will be experienced by either the ceramic tape 32 or the dry press material 38, upon sintering, depends in part upon the degree to which either of these ceramic materials has been pressed. In particular, the shrinkage experienced by a ceramic material upon sintering is normally decreased upon an increase in the degree to which the material is pressed. The formulation for the dry ingredients to be included in a ceramic slip material shown in Table 1 has been found suitable for practice of the present invention.

TABLE 1

| Alumina (95% 10) | 95.3% |
|---|---|
| Talc (Mistron 139) | 2.8% |
| Kaolin | 1.9% |

To form the dry press material 38, this formulation of dry ingredients is mixed with a binder, preferably a water soluble binder, e.g. polyethylene glycol. The amount of binder used must be sufficient to provide for integrity of the green body, and should be in an amount that will result in shrinkage such that the sintered body 22 has the desired shape. As discussed above, the amount of shrinkage is affected by the dry press pressure, as well as the amount of binder. Any amount of binder which results in the described amount of shrinkage, provides an integral green body and results in a dry-pressed layer which is compatible with the cast tape layer can be used. An amount of polyethylene glycol binder between about 4 wt. % and about 8 wt. %, preferably about 6.5 wt. % based on the weight of the dry press material 38, is operable.

To form the cast tape slip material 20, the particle size of the ceramic material in the ceramic slip 20 must be sufficiently small that the desired degree of smoothness of the ceramic tape 32 can be obtained. It has been found that ceramic tape having 95% of the particles less than about 10 microns suffices for this purpose. The above formulation of dry ingredients is mixed with about 3 to 6 weight percent binder, e.g. Rhoplex H-A8.

The ceramic materials are mixed with a liquid matrix to form a flowable ceramic slip 20 capable of being applied to the carrier 18. In the preferred embodiment, the liquid matrix is water with a binder which is mixed so as to produce a slip having about 70% solids.

After application of the ceramic tape material, the ceramic tape 32 is dried. The drying may be by means of air drying or can be accelerated by use of an oven 40 or other known means. When the ceramic tape 32 has dried sufficiently that the ceramic tape 32, as reinforced by the carrier 18, if present, has sufficient strength to withstand stripping of the film 10, the film 10 is stripped from the ceramic tape 32 by separation from the carrier layer 18 at stripping station 42 to provide stripped film 44. It is possible for the stripped film 44 to be reused in the process, possibly after cleaning of the stripped film 44 or other processing. Alternatively, the film 10 can be formed in an endless loop so that after stripping at the stripping station 42, the stripped film 44 can be continuously cleaned or otherwise processed, returned to an upstream portion of the cast tape production process and reused as the film 10.

The cast tape ceramic produced according to this embodiment of the invention has a unique structure comprising a layer of ceramic material and a layer of polyvinyl butyral adjacent the ceramic layer. The unique character of this cast tape is useful in that it provides for a cast tape which can be formed very thin, such as less than about 0.02 inches, and yet has a required degree of strength or cohesion with a low binder content.

Figure 4:
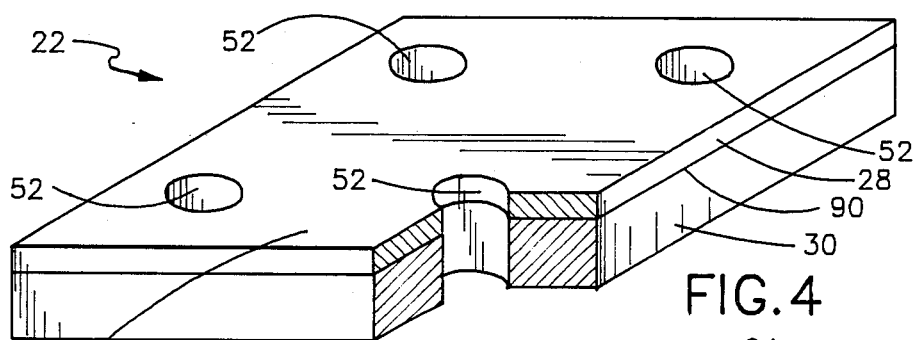
FIG. 4 is a perspective view of the smooth-surfaced ceramic substrate of the present invention with a portion broken away to illustrate the cast tape layer in a flush relationship to the base layer.

In order to understand the complete flow of the present invention, there will now be discussed a second series of steps which merges with those steps already described. This second series of steps will preferably be conducted simultaneously with the steps already described and at such a rate that the ceramic or cast tape 32 can be efficiently used. This second series of steps is directed to formation of a dry press ceramic body which is adhered to or integrated with a portion of the cast tape 32 so as to form a green body 36. A dry press die 48 is provided generally in a concave shape having a cavity 50 of a predetermined size. This size is such that when a green body 36 is produced having this size, it will shrink, upon sintering, to a finished product 22 having the desired finished size. The size of the cavity 50 thus depends both on the size of the desired finished product 22 and the amount of shrinkage that takes place upon sintering. As noted above, the amount of shrinkage depends practically upon the binder content of the composition and the dry press pressure. In many applications, it is desired to produce a finished product 22 as depicted in FIG. 4 having a plurality of holes 52 extending through the thickness of the finished ceramic substrate 22, as described above. It is often required that these holes 52 have a predetermined spatial position and relationship and a predetermined size. In order to produce these holes 52, a plurality of pins 54 are provided in the die 48. The size and position of the pins 54 are designed such that, upon sintering of the green body 36, the resultant holes 52 are in the desired position and have a desired size.

Figure 3A:
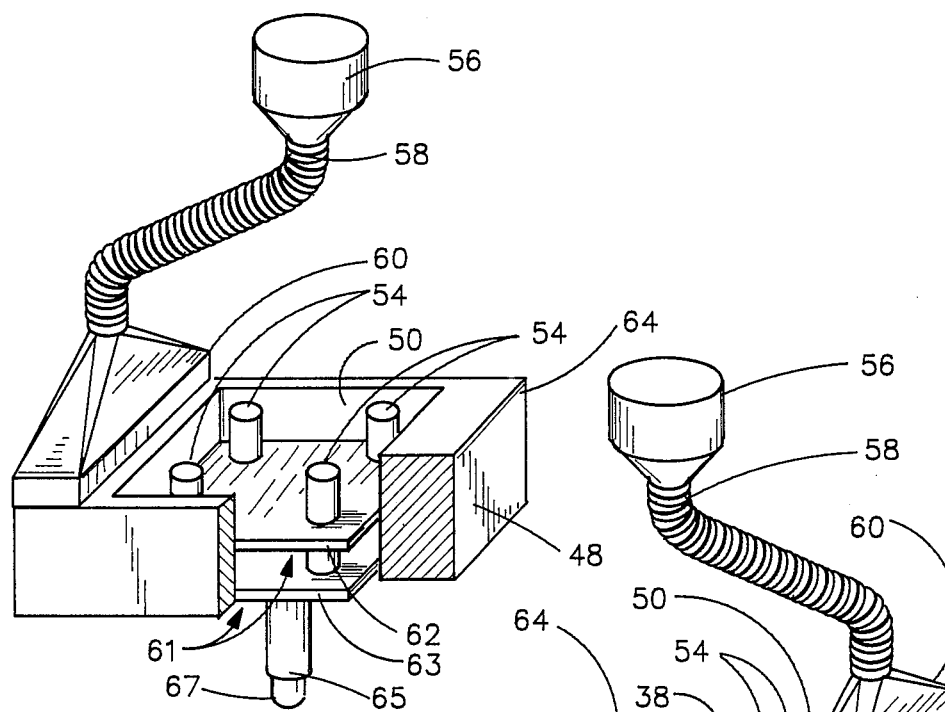
FIGS. 3A-3C are perspective views of an apparatus and method for filling a die with dry press material, with a portion of the die cut away to show a movable bottom.
Figure 3B:
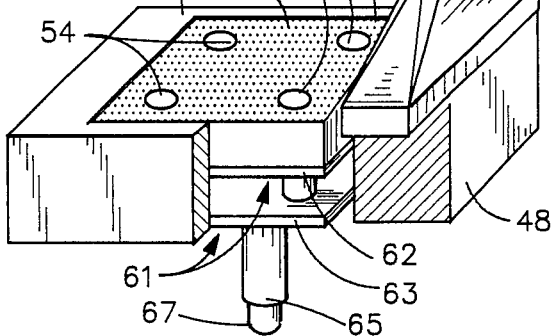
Figure 3C:
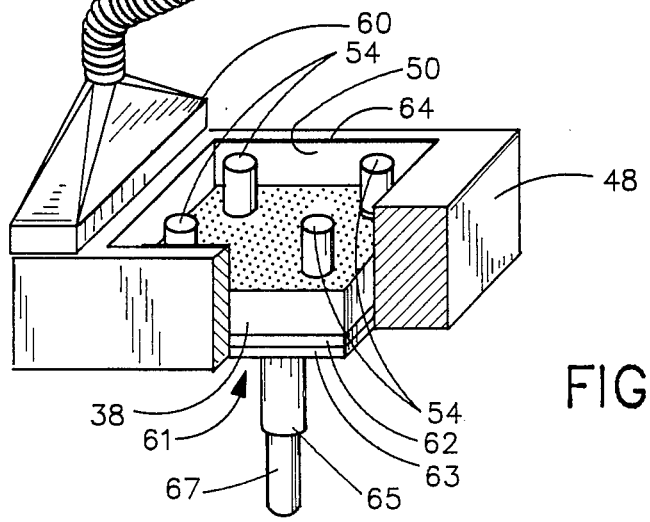

In one embodiment, as shown in FIGS. 3A–3C, the dry press material 38 is spray dried to a particle size distinction such that the dry press material 38 is substantially flowable by methods well known in the ceramics art. The cavity 50 of the die 48 is filled with dry press material 38, conveniently by means of a fill chute 60. From a hopper 56 containing dry press material, the dry press material 38 travels through a tube 58 to a fill chute 60. The fill chute 60 has a width substantially equal to the width of the die 48 and is mounted so as to be able to move across the open face of the die 48 in a horizontal direction. The fill chute 60 is equipped with openings on its lower surface to permit dropping dry press material 38 out of the fill chute 60. The die 48 is preferably equipped with a movable bottom 61. The bottom 61 comprises superposed upper and lower plates 62, 63 which are movable with respect to each other. Movement of the lower plate 63 is controlled by a first control rod 65. Movement of the upper plate 62 is controlled by movement of a second control rod 67, disposed concentrically with the first control rod 65. The movable bottom 61 is movable in order to permit adjustment of the thickness of the base portion, as well as to assist in filling the die 48 with dry press material 38 in such a manner that the upper surface of the dry press material 38 is substantially level but somewhat recessed from the upper edge 64 of the die 48, in the manner described below.

As depicted in FIG. 3A, prior to filling the die 48, the upper plate 62 is preferably positioned above its lowermost position and a distance below the upper rim 64 of the die 48 which is equal to the desired thickness or depth of the layer of dry press material 38. The fill chute 60 is then moved across the open face of the die 48 and dry press material is conveyed from the hopper 56 via the tube 58 to the fill chute 60 to drop the desired amount of dry press material 38 into the cavity 50 of the die 48. The fill chute 60 is then moved horizontally away from the die 48. The die 48 is, at this point, filled with dry press material 38 as best seen in FIG. 3B. The fill chute 60 can then be returned to its original position, as depicted in FIG. 3C. The upper plate 62 is preferably lowered by moving the second control rod 67 downwardly to provide an upper surface of the dry press material 38 which is recessed from the upper rim 64 of the die 48 as best seen in FIG. 3C. The amount of movement of the upper plate 62 depicted in FIG. 3C is exaggerated for clarity. The upper plate 62 will usually move only a small amount, on the order of the thickness of the cast tape layer. The method of the present invention also can be used without any movement of the movable bottom 61.

As discussed above, the dry press material 38 must be compatible with the ceramic slip material 20. The composition listed in Table 1, suitable for the ceramic slip material 20, has also been found to be suitable for the dry press material 38. After introduction of the dry press material 38 into the cavity 50 and any required leveling of the dry press material 38, the die 48 is in condition for introduction of the cast tape 32.

According to one method for introducing the cast tape 32, the ceramic tape 32 is turned over so that the exposed surface 66 of the ceramic portion of the ceramic tape 32 faces downward and the carrier layer 18 faces upward. As depicted in FIG. 1, the turning over of the ceramic tape 32 is accomplished by bending the tape downward and then back in a direction opposite to the original direction of travel of the tape 32. The tape 32 can also be turned over by, for example, twisting the tape around its longitudinal axis. The ceramic tape 32 is then positioned above the partially filled dry press die 48. Although for clarity of illustration the cast tape 32 is depicted as positioned some distance above the die 48, in practice it is preferred to position the tape 32 so as to intimately overlie the die 48. A punch/pressure member 68 is provided for use in both punching out a portion of the cast tape 32 in the desired shape and applying pressure to the tape and dry press material in the die 48. When the finished ceramic substrate 22 possesses holes 52, the punch/pressure member 68 is configured to cooperate with the edges of the die 48 and provided with holes 70 to cooperate with pins 54 to produce a tape portion having corresponding holes 52. The punch/pressure member 68 must have sufficient sharpness and be applied with sufficient pressure to produce the desired tape portion without distorting the tape to such a degree that the smoothness of the surface is seriously degraded.

The punch/pressure member 68 is moved downward into the cavity portion 50 of the die 48. Initial movement of the punch/pressure member 68 punches out a portion of the tape 32 of a size and shape which fits within the cavity 50 of the die 48. Continued movement of the punch/pressure member 68 into the cavity 50 results in the application of pressure to the tape 32 and dry press material 38 residing in the cavity 50.

Press member 68 is shaped to mate with the shape of the cavity 50, allowing for clearance of the pins 54, for instance through press holes 70, in order to produce a substantially uniform pressure on the tape 32 and dry press material 38. The pressure surface 72 of the press member 68 will come in direct contact with the smooth surface or carrier 18 of the cast tape 32. For this reason, it is desirable to provide the pressure surface 72 of the punch/pressure member 68 having a substantially smooth surface so as to minimize degradation of the smooth surface of the cast tape 32. A certain amount of degradation is, however, unavoidable in practice so that the smoothness of the smooth surface must be somewhat greater than that desired for the final product 22.

Figure 2:
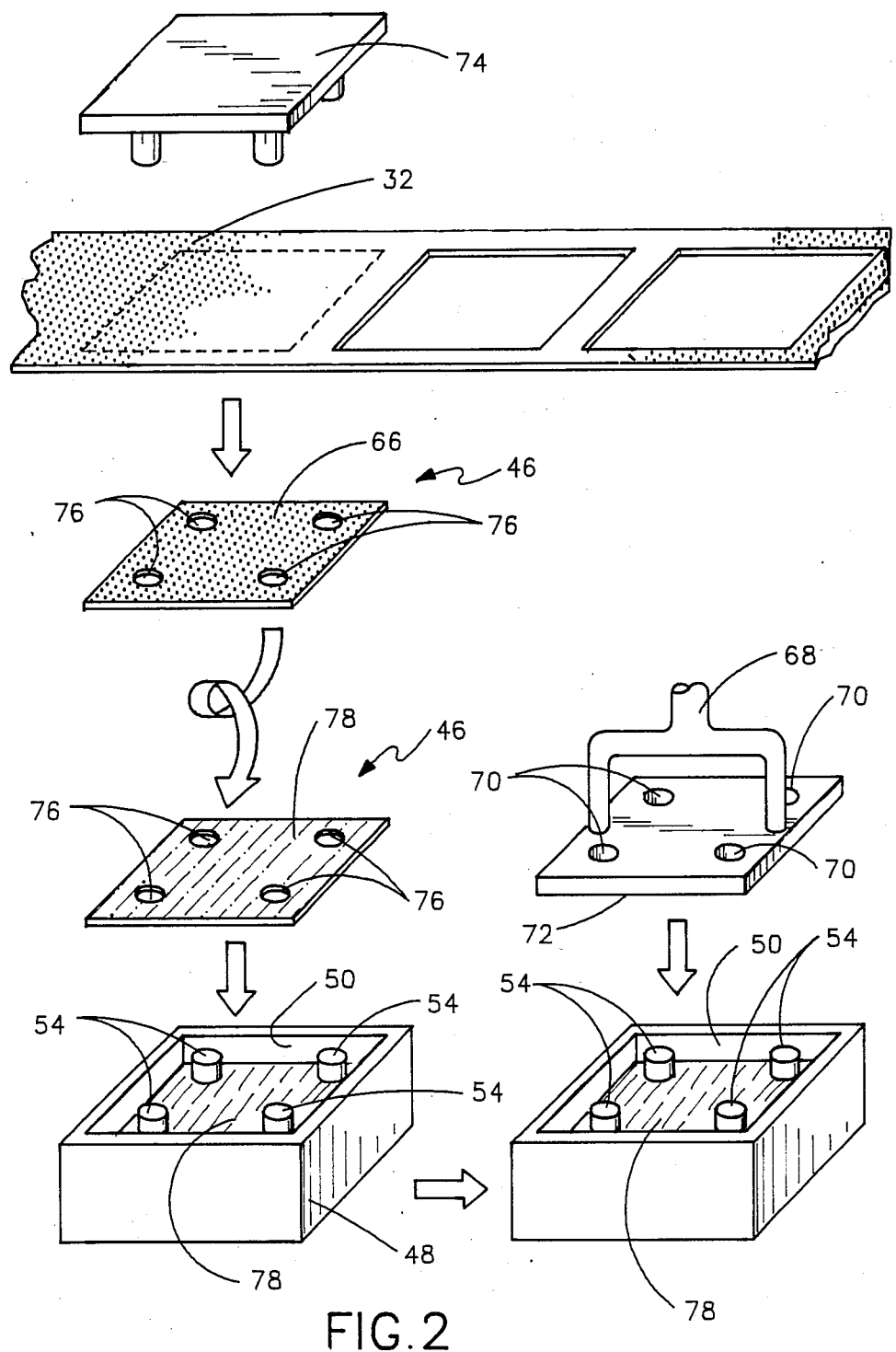
FIG. 2 is a schematic diagram of a portion of the process for producing a smooth-surfaced ceramic substrate depicting a method for placing a portion of a cast tape in a die cavity.

Another method for placing a portion of the cast tape 32 into the die 48 is depicted in FIG. 2. According to this embodiment, when the ceramic tape 32 has dried sufficiently to withstand the subsequent handling described below, the ceramic tape 32 is cut to a size and shape which will fit within the dry press die as described below. The shaping can be performed by any of a number of processes but is preferably performed by application of a punch 74. When the finished ceramic substrate 22 possesses holes 52, the punch 74 is configured so as to produce a shaped tape 46 having corresponding holes 76. The punch must have sufficient sharpness and be applied with sufficient pressure to produce the desired shaped tape portion 46 without distorting the tape portion 46 to such a degree that the smoothness of the smooth surface 78 of the shaped tape 46 is seriously degraded. The sharpness and pressure required will depend upon the composition and thickness of the ceramic tape 32 and particularly the carrier layer 18 thereof. Before the shaped cast tape 46 is placed into the cavity 50, it is positioned, for example by rotating, such that the smooth surface 78, having the carrier layer 18 thereupon, will face outward of the cavity 50. In this manner, the exposed surface 66 of the ceramic portion of the ceramic tape 32, i.e. the face opposite the smooth face 78, is placed in contact with the dry press material 38 in the cavity 50. The holes 76 of the shaped tape 46 are aligned with and positioned to be traversed by the pins 54. The shaped tape 46 and dry press material 38 are then pressed by application of a press member 68 in the manner described above in connection with the embodiment depicted in FIG. 1.

The amount of pressure needed depends at least partly on the composition of the tape 46 and dry press material 38 and the amount of shrinkage that can be tolerated during sintering. At a minimum, the pressure must be sufficiently high to produce an integrated green body, i.e, a green body which can be subjected to the handling required to remove the body from the die, and perform the desired sintering without crumbling or breaking of the green body, separation of the layers, or substantial degradation of the smoothness of the smooth surface. A more important consideration with regard to the amount of pressure relates to the fact that, other factors being equal, a higher dry press pressure produces a green body which experiences less shrinkage during sintering than would a green body produced with less pressure. Thus, it is possible to adjust the amount of shrinkage by adjusting the dry press pressure. In particular, it is possible, within certain bounds, to offset the increase in shrinkage which normally results from increasing the amount of binder in the ceramic tape 32 or dry press material 38 by increasing the dry press pressure. It should be noted that if a higher amount of dry pressing pressure is employed, with consequent reduction in shrinkage during sintering, the size of the cavity 50 of the die 48 should be reduced compared to the size of the cavity 50 used with a smaller amount of dry pressing pressure. Thus, adjustment of dry pressing pressure will require retooling of the punch and die apparatus.

Referring again to FIG. 1, after the required pressing is completed and the press member 68 is removed, the green body 36 is removed from the cavity 50. Removal can be accomplished by moving the second control rod 67 upward so as to move the first plate 62 upward to push the green body 36 out of the die cavity 50. At this point, the green body has a unique structure comprising a base layer 80 of ceramic powder and a cast tape layer 82 having a smooth surface 84 and another surface 66 adjacent to and integral with the base 80. In the preferred embodiment, the smooth surface 84 comprises a layer of vinyl butyral.

The green body 36 is conveyed to a furnace 86 for sintering. Sintering is conducted by any of the methods known for sintering a ceramic material appropriate for the particular ceramic composition used. In one embodiment, a low fire ceramic material is used and sintering is conducted as low as about 500° C. In the embodiment in which the ceramic comprises alumina, the green body is sintered at a temperature from about 1350° C. to about 1800° C., at ambient pressure, with the temperature depending upon the composition of the green body 36 being sintered. The sintering temperatures are normally sufficiently high that the vinyl butyral layer is destroyed such as by oxidation or volatilization, leaving a smooth-surfaced ceramic layer. As will be known to those skilled in the art, particular compositions or applications may require sintering done under pressure, either mechanical pressure or isostatic pressure, or sintering conducted under special atmospheres such as non-oxidizing atmospheres, reducing atmospheres, etc.

The temperature and length of time used for the sintering step will vary depending upon the composition of the ceramic used, in a manner known to those skilled in the art.

The sintered green body is cooled and removed from the furnace 86 to produce a finished product 22. The finished product 22 has a smooth surface 34 suitable for application of fine lined electrical circuitry. The smooth surface 34 results from the surface of the ceramic portion of the cast tape 32 which was in contact with the carrier layer 18. The sintered ceramic substrate 22 has a unique composition comprising a base layer 30 of ceramic powder and a cast tape layer 28 having a smooth surface 34 and another surface 90, the other surface adjacent to and integral with the base layer 30.

The present invention also includes a number of variations on or departures from the embodiment described above. Any method which produces a cast tape with the required degree of smoothness on one face can be used, and it is thus not required in all embodiments of the invention that the film 10 or the carrier 18 be used. In some cast tape methods which can be used in this invention, the ceramic slip material 20 can be applied to a belt such as a metal belt or a TEFLON belt before drying and stripping therefrom.

In some cast tape methods, the ceramic material 20 is applied to decal paper. In this method, the ceramic slip material is mixed with a water insoluble matrix and the ceramic tape is removed from the decal paper by floating the tape off of the decal paper in a water environment. If it is desired to use a water soluble binder for the ceramic slip material, the ceramic tape material can be floated off the decal paper using a solvent soluble parting medium. Because of the roughness of many decal papers, it is expected that this embodiment would be most useful when only an intermediate degree of smoothness of the finished product is required.

The bottom layer 80 of the green body 36 can be produced by methods other than dry pressing. Any of the methods for producing a green body capable of being handled and subsequently sintered so as to form an integral, sintered ceramic substrate, with the smooth-faced tape, can be used for production of the lower layer 80. Examples of such methods are isostatic pressing, sintering or "pre-sintering" such as heating to sub-sintering temperatures, reaction bonding, hot-pressing, pressureless sintering, and other methods known in the ceramic art.

A roll compacted ceramic can be used in place of the dry press produced lower layer 80. In the roll-compacted method, a strip of ceramic material is pressed or compacted by feeding the ceramic material through one or more series of rollers positioned so as to compact the ceramic material therebetween. Since this method produces a continuous strip of ceramic material, such strip could be combined with the smooth-surfaced cast tape ceramic in a continuous manner by bringing the exposed ceramic face 66 of the cast tape material into contact with the roll-compacted strip of ceramic material and forming an integral strip from these two separate strips by, for example, roll compacting the two strips together. This integrated two layer strip could then be shaped, such as by cutting or punching, to form a green body substantially in the same configuration as the green body 36 produced by the dry press method. Alternatively, the roll-compacted strip of ceramic material could be shaped by cutting or punching before it is contacted with a shaped portion of cast tape ceramic and the two shaped portions could be pressed together in a die or by such methods as a roll compaction. The ceramic substrate of the present invention can also be produced by a method wherein the ceramic tape layer does not adhere to or only loosely adhere to, the base layer 80 prior to sintering and in which the adhesion of the cast tape layer 82 to the base layer 80 occurs by virtue of the sintering step. In such a method, the cast tape layer is placed in the desired aligned relationship with a base layer and the two aligned layers are placed in the sintering furnace 86 for sintering, possibly by such methods as hot pressing or isostatic hot pressing, to produce the integral finished product 22.

Either or both of the green body 36 or the sintered ceramic substrate can be formed in a shape other than that desired for the finished product 22, with shaping of the finished product 22 occurring after production of the green body 36 and before sintering. Such shaping could be accomplished by diamond sawing and grinding, for example.

In some applications it is desirable to produce a base layer 80 which has enhanced hardness or chip resistant qualities as compared to the hardness or chip resistance of the cast tape layer 82. One method of enhancing the hardness of certain ceramic materials is the addition of alkaline earths such as calcium to the ceramic material. Such hardening additives, however, may have an undesirable effect on the adherent qualities of the ceramic product. When electrical circuitry is applied to the surface of such a hardened ceramic, there is a tendency for the substance comprising the circuitry to peel off the ceramic substrate, particularly after aging. One aspect of the invention, then, includes forming a green body 36 in which the base layer 80 is hardened or rendered chip resistant but in which the cast tape layer 82 does not contain hardening additives which might be detrimental to application of or adherence of circuitry.

In another aspect, the hardness or chip resistance of the finished product 22 is further enhanced by providing for a buffer or bumper zone of hardened material near the edges of the cast tape layer. This bumper can be provided in two manners: (1) by countersinking the cast tape layer 82 with respect to the base layer 80, and (2) by providing a "pull back" such that the edge of the cast tape layer 82 is spaced inward from the edges of the base layer 80. Either of these methods can be used to provide a bumper around any or all of the outside edges of the ceramic substrate and/or around the edges of any substrate holes 52 which may be provided.

Production of the countersink configuration of the bumper is accomplished by shaping the tape layer 46 in the manner depicted in FIG. 2 to have a surface area less than the cross-sectional area of the cavity 50. In this way, when the shaped tape 46 is placed into the cavity 50, one or more of the edges of the shaped tape 46 will lie inward of the edge of the cavity 50. In order to provide a bumper around all four edges, the shaped tape 46 is positioned so that all four edges of the tape 46 are spaced inward from the edges of the cavity 50. If it is also desired to provide a bumper around the holes 52 in the finished product 22, the holes 76 of the shaped tape are formed with a diameter somewhat larger than the diameter of the pins 54 and the shaped tape 46 is positioned within the cavity 50 such that the edges of the holes 76 are spaced outward from the surface of the pins 54.

Figure 5:
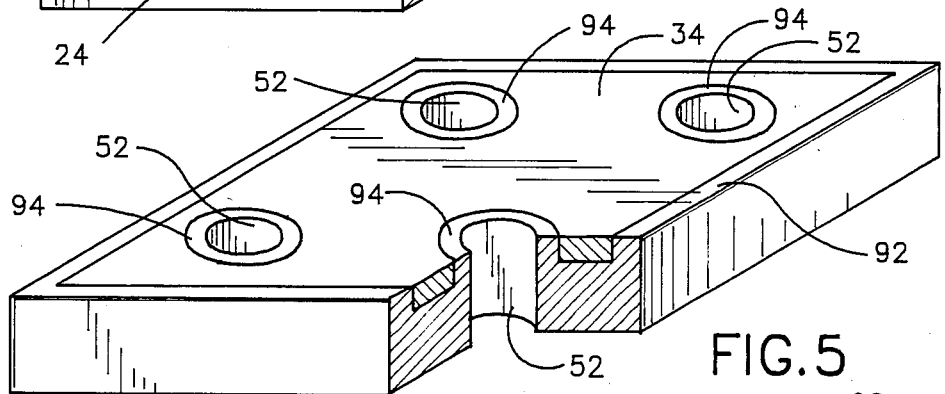
FIG. 5 is a perspective view of the smooth-surfaced ceramic substrate of the present invention with a portion broken away to illustrate the cast tape layer in a countersink relationship to the base layer.

When the reduced cross sectional area of shaped tape 46 is placed and aligned within the cavity 50 as discussed above, the tape 46 and dry press material 38 can be subjected to dry pressing. Upon dry pressing, as described above, the shaped tape 46 will be pressed downward into the dry press material 38 until the upper surface 78 of the shaped tape 46 is level with the upper surface of the dry press material 38 which will form the bumper 92, as best shown in FIG. 5. The edge bumper 92 of the countersink embodiment, as well as the hole bumpers 94 are thus formed by virtue of the dry press material, still in a somewhat flowable form, being forced, by virtue of the pressure developed in the press, upward through the space formed between the edge of the shaped tape 46 and the edge of the cavity 50. The green body thus formed can be removed from the die and sintered in the manner already described above.

Figure 6:
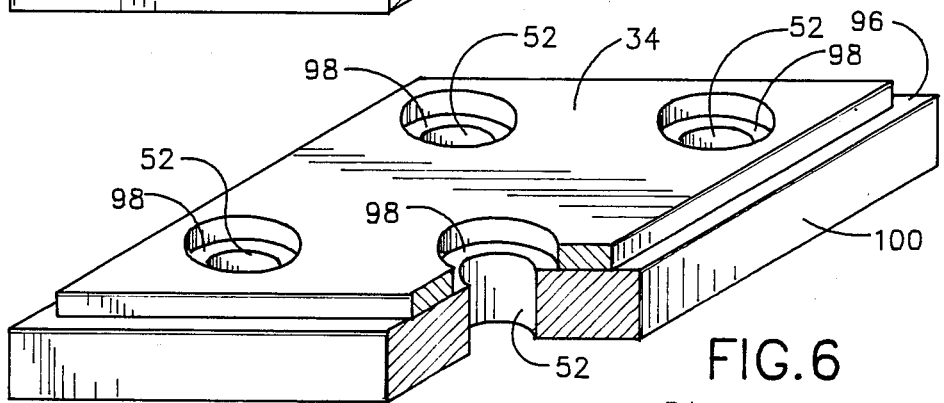
FIG. 6 is a perspective view of the smooth-surfaced ceramic substrate of the present invention with a portion broken away to illustrate the cast tape layer in a pull-back relationship to the base layer.

Production of the "pullback" embodiment is accomplished in a manner similar to that of the countersink embodiment, except that the cast tape 32 is not pressed into the dry press material 38 but is pressed so as to lie on top of the dry press material. This can be accomplished by treating the dry press material 38 so as to substantially prevent it from flowing or moving up into the space between the edge of the shaped tape 46 and the edge of the cavity 50. This treatment can include subjecting the dry press material 38 to a pressing step prior to placing the shaped tape 46 into the cavity 50. This first pressing compacts the dry press material 38 sufficiently that it is no longer sufficiently flowable to flow or move upward past the edge of the shaped tape 46 during a second pressing operation. Following the first pressing, the shaped tape 46 formed in the manner depicted in FIG. 2 is placed into the cavity 50 and aligned in the manner already discussed with respect to the countersink embodiment. The shaped tape 46 and pressed dry press material 38 are then subjected to a second pressing to adhere the shaped tape 46 to the dry press material 38 and form an integral green body. As best shown in FIG. 6, the integral green body contains a bumper edge 96 and hole bumpers 98 which are formed by virtue of the edges of the shaped tape 46 being spaced inward from the edges of the base layer 100. The green body is removed from the die and subjected to sintering in the manner described above.

Figure 7:
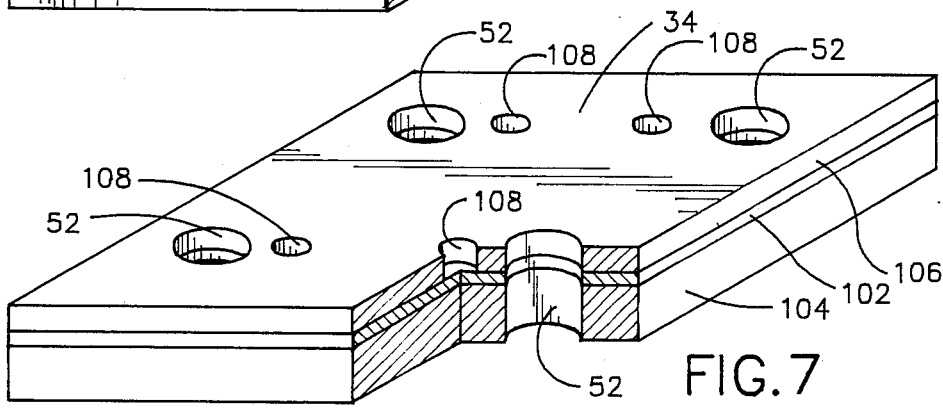
FIG. 7 is a perspective view of the smooth-surfaced ceramic substrate of the present invention with a portion broken away to illustrate a conductive layer and through vias.

The method of this invention can be used to provide a ceramic substrate having an internal conductive layer or circuitry layer. According to this method, a layer comprising conductive material, either in the form of a sheet of conductive material or a pattern or conductive circuitry, is applied to the exposed surface 66 of the cast tape. Such application may be by a number of means known in the art and is conveniently by a printing means, such as screen printing. The remainder of the operation can be conducted in the manner described above. The resulting ceramic substrate, as best seen in FIG. 7, contains a conductive layer 102, either in the form of a sheet of conductive material or a pattern of conductive material, preferably in the form of electrical circuitry, sandwiched between the base layer 104 and the cast tape layer 106. The conductive material 102 is preferably a material which has sufficient adherent qualities that the green body and the sintered product are integral and not subject to separation of layers. The conductive material 102 is also preferably a material which is not substantially degraded by the temperatures used during sintering. Examples of such conductive materials are tungsten and molymanganese. Further, the conductive material 102 should be in a form such that its shrinkage during sintering substantially matches the shrinkage of the base layer 104 and the cast tape layer 106 to prevent warping, cambering or creation of internal stress. The amount of shrinkage of the conductive material 102 can be adjusted by, for example, adjusting the particle size of the material or by adjusting the binder material which may be employed in conjunction with the conductive material.

In order to provide for access to the conductive layer or circuitry formed in this manner, through vias 108 can be formed in the cast tape layer. These through vias can be formed in the same manner that the holes 76 are formed in the shaped tape 46 by, for example, punching. In order to prevent the dry pressed material from entering the pressing step, it may be desirable to press the dry press material 38 prior to placing the cast tape 46 and conductive layer 102 into the cavity 50 to reduce flowability of the dry press material 38 in the manner described above in connection with the pull-back embodiment.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A method of producing a smooth-faced green body ceramic substrate, comprising:
   placing a substance comprising powdered ceramic in the cavity of a press;
   casting a ceramic tape having at least a smooth first face and a second face, said ceramic tape including a ceramic compatible with said powdered ceramic;
   locating a portion of said tape adjacent to said cavity; and
   dry pressing said tape portion and said substance to form a integrated smooth-faced green body ceramic substrate.

2. The method of claim 1 wherein:
   said casting step includes casting a ceramic slip on one surface of a smooth carrier.

3. The method of claim 1 wherein:
   said casting step includes casting a ceramic slip on one surface of a smooth carrier comprising polyvinyl butyral.

4. The method of claim 2 wherein:
   said casting step includes forming said carrier by casting said carrier on a surface of a film.

5. The method of claim 4 wherein:
   said locating step includes stripping said film from said carrier.

6. The method of claim 1 further comprising:
   sintering said green body.

7. The method of claim 1 wherein:
   said locating step includes shaping said tape portion wherein said tape portion fits in said cavity.

8. A method for producing a smooth-faced ceramic substrate comprising:
   placing a substance comprising powdered ceramic in the cavity of a press;
   forming a smooth carrier by casting on the surface of a film;

forming a smooth-faced ceramic tape by casting a ceramic slip on one surface of said carrier;

drying said ceramic tape;

stripping said film from said carrier;

punching a portion of said tape in a shape to fit in said cavity;

placing said shaped tape portion in said cavity with the face opposite said smooth face in contact with said substance;

dry pressing said tape and said substance to form an integrated smooth-faced green body; and sintering said green body.

9. A method for producing a smooth-faced ceramic substrate comprising:

placing a substance comprising powdered ceramic in the cavity of a die;

forming a smooth-faced ceramic tape;

positioning at least a portion of said ceramic tape adjacent to said die;

positioning a punch adjacent said portion of said ceramic tape;

cutting said tape portion while moving said punch;

dry pressing said tape portion and said substance using said punch to form an integrated smooth-faced green body; and sintering said green body to form a smooth-faced ceramic substrate.

10. A method of forming a ceramic substrate with a couter-sunk smooth face comprising:

placing a substance comprising powdered ceramic in the cavity of a press having a first cross sectional area;

casting a ceramic tape having at least one smooth face and one other face, comprising a ceramic compatible with said powdered ceramic;

shaping a portion of said tape to fit within said cavity such that the area of one surface of said shaped tape is less than said cross sectional area of said cavity;

placing said shaped tape portion in said cavity with said other face in contact with said substance; and dry pressing said tape and said substance to form an integrated ceramic substrate.

11. A method of forming a ceramic substrate with a pulled-back smooth face comprising:

placing a substance comprising powdered ceramic in the cavity of a press having a first cross sectional area;

dry pressing said substance;

casting a ceramic tape having at least one smooth face and one other face comprising a ceramic compatible with said powdered ceramic;

shaping a portion of said tape to fit within said cavity such that the area of one surface of said shaped tape is less than said cross sectional area of said cavity;

placing said shaped tape portion in said cavity with said other face in contact with said substance; and dry pressing said tape and said substance to form an integrated ceramic substrate.

12. A method of forming a smooth-faced ceramic substrate with an interior conductor comprising:

placing a substance comprising powdered ceramic in the cavity of a press;

casting a ceramic tape having at least one smooth face and one other face comprising a ceramic compatible with said powdered ceramic;

shaping a portion of said tape to fit in said cavity;

placing a conductive material in said cavity in contact with said substance;

placing said shaped tape portion in said cavity with at least a portion of said other face in contact with said conductive material; and dry pressing said tape, said conductive material, and said substance to form an integrated ceramic body.

13. The method of claim 12 wherein said conductive material is placed in said cavity by a method comprising:

forming a layer of said conductive material on said other face of said tape; and placing said tape in said cavity with at least a portion of said conductive material in contact with said mixture.

14. The process of claim 12 further comprising forming through vias intersecting said tape to expose a portion of said conductive material.

15. The method of claim 14 further comprising forming said through vias by punching said tape.

* * * * *